US008265818B2

(12) United States Patent
Allport (10) Patent No.: US 8,265,818 B2
(45) Date of Patent: Sep. 11, 2012

(54) OPEN ARCHITECTURE COMMAND SYSTEM

(75) Inventor: Christopher Samuel Allport, Hanover, PA (US)

(73) Assignee: Defense Technologies, Inc., Tampa, FL (US)

( * ) Notice: Subject to any disclaimer, the term of this patent is extended or adjusted under 35 U.S.C. 154(b) by 552 days.

(21) Appl. No.: 12/478,080

(22) Filed: Jun. 4, 2009

(65) Prior Publication Data

US 2010/0312917 A1   Dec. 9, 2010

(51) Int. Cl.
*G01C 22/00*   (2006.01)
(52) U.S. Cl. ............... 701/23; 244/10; 331/1 A; 331/27; 318/568.1; 318/603; 318/618
(58) Field of Classification Search ................... 701/23; 244/10; 331/1 A, 27; 318/568.1, 603, 618
See application file for complete search history.

(56) References Cited

U.S. PATENT DOCUMENTS

| | | |
|---|---|---|
| 2005/0170829 A1 | 8/2005 | Seo |
| 2007/0244608 A1* | 10/2007 | Rath et al. .......................... 701/3 |
| 2007/0250260 A1 | 10/2007 | Ariyur et al. |
| 2007/0284474 A1 | 12/2007 | Olson et al. |
| 2008/0215204 A1 | 9/2008 | Roy et al. |

OTHER PUBLICATIONS

MVCS (Multi Vehicle Control System), Raytheon, www.raytheon.com, 2007.
Raytheon Simulation Controls Multiple UAVs and an Unmanned Surface Vehicle, http://somd.com/news/headlines/2006/3615.shtml, 2006.
SURC (Soldiers Universal Robot Controller Software), www.foster-miller.com/literature/documents/DSO8-051-SURC.pdf, 2008.

* cited by examiner

*Primary Examiner* — Thomas G. Black
*Assistant Examiner* — Luke Huynh
(74) *Attorney, Agent, or Firm* — Kilpatrick Townsend & Stockton LLP (57) ABSTRACT

A command and control system is provided including a core unit, with a processor and a map display engine. The core unit is configured to exchange information with a multi-domain heterogeneous unmanned vehicle command and control module, a multi-sensor command and control module, and an asset tracking module. The asset tracking module estimates a location of an indeterminate object. A control unit exchanges information with an input device. A detecting unit detects modules that are associated with the core unit. A subscription unit logs parameters associated with the detected modules and determines types of data to send to the detected units based on the parameters. A script unit receives and implements command and control scripts for the detected modules. A display output provides display information of a combined representation of information from the detected modules and map information, including locations of the vehicles and sensors under control and the estimated location of the indeterminate object.

30 Claims, 10 Drawing Sheets

OPEN ARCHITECTURE COMMAND SYSTEM

This invention was made with Government support under N00421-05-D-0055 awarded by Naval Air Warfare Center AD (PAX). The Government has certain rights in this invention.

BACKGROUND OF THE INVENTION

Unmanned vehicles (UVs) are remotely piloted or self-piloted vehicles that can carry cameras, sensors, communications equipment, or other payloads. UVs can operate in all domains, that is, air, land, water surface and subsurface and space. Many terms have been applied to such vehicles, such as, unmanned aerial vehicles (UAVs), unmanned surface vehicles (USVs), autonomous underwater vehicles (AUVs), and unmanned underwater vehicles (UUVs) to name a few. UVs may also be referred to as Unmanned Systems, to reflect that the systems may include a ground/control station and other elements besides the vehicle itself.

UVs have recently taken on a more widespread role in reconnaissance, intelligence gathering, and direct action. UVs are particularly suited to various surveillance, reconnaissance and other military applications due to their diverse capabilities and relatively low cost of operation. However, the use of UVs is not limited to such roles, and can find applicability in other areas such as transport, research and search and rescue.

Remotely piloted UVs may be controlled from a ground, surface or airborne user station that is configured to the specific UV under control. Existing UV systems are typically controlled using either direct RF communication or other communication links, such as satellite communication. Wired control may also be used in certain situations where jamming or RF emissions are of concern, e.g. wire guided missiles and ordinance disposal.

Sensor monitoring and control is also known in the fields of intelligence and security systems. Sensor monitoring may be distinguished from UV control in that sensors per se typically do not include independent locomotive means. That is, although sensors may be aimed, tuned, or otherwise manipulated, the sensor itself is generally fixed to some platform or is unguided.

Other command, control and security stations also exist for directing or monitoring specified operations or facilities in military, police and other civil and private contexts, such as, the Aegis Combat System, airport operations management systems, and security surveillance suites. Such systems have become even more critical in light of modern asymmetric security and response challenges facing governmental and private sector actors.

BRIEF SUMMARY OF THE INVENTION

Combining command and control of multiple heterogeneous multi-domain UVs, along with other heterogeneous sensor monitoring, and indeterminate target tracking, from a single user station presents problems that have not yet been addressed by current systems. For example, many UV control systems are programmed to control a single UV type or accommodate a single domain. Reprogramming such systems to control a different UV in a different domain may be time consuming or impossible depending on the limitations of the system architecture and programming. Additionally, current systems do not incorporate the three categories of heterogeneous multi-domain UV command and control, heterogeneous sensor monitoring, and indeterminate target tracking in a single, flexible system that is both expandable and reconfigurable at the user level, to meet a wide variety of command and control situations.

Although there have been efforts to allow for interoperability among some systems, such as through Standardization Agreements (STANAG), current systems still routinely use "private messages" that are not standardized across systems and which interfere with interoperability of control, communication and modification.

As used herein, "indeterminate target tracking" should be understood to apply to the estimation of a target's position from inputs that may be less than exact for various reasons. In disclosed embodiments, indeterminate target tracking may be achieved by fusing various sources, such as historical information, intelligence reporting, all-source intelligence monitoring, etc., that may relate to a given target. An example of indeterminate target tracking may include high-value individual human beings, such as criminal or terrorist individuals. In this context, the location of an indeterminate target may become more specifically determined, or exact, when a single source, or multiple similar source, input is sufficiently finite to provide reliable location information, e.g., a radar or global positioning system (GPS) fix. Indeterminate target tracking is complicated in asymmetrical warfare situations, in which the relevant targets (e.g. individual human beings) may change between transportation means, thus changing the movement profiles for location estimation. Indeterminate target tracking is not limited to such scenarios however, and may include, for example, tracking any objects that are of interest or concern to the operator of the UV command and control system.

"Remote assets" or "assets" may include both multiple heterogeneous multi-domain UVs, UV capabilities and heterogeneous sensors under the command, control or monitor of the open architecture command system.

Another problem that is present in the field of remote command and control units, such as those used with UVs, is information overload. For example, in a crowded battlespace using modern tracking and recognition protocols, there may be hundreds of identified assets within the displayed portion of the battlespace. The types of assets may include, ground elements, such as infantry units, ground vehicles, piloted aircraft, boats, and UVs. Each type of asset may have different significance with respect to a particular asset under control. Thus, it would be helpful to identify new ways to selectively screen out the display of assets of less significance to those assets under control of a particular command and control system, as well as to initiate the display of assets as they become more significant.

Embodiments of the present subject matter are directed to systems and methods that serve, for example, the diverse needs of multi-domain heterogeneous UV control, multi-sensor command, control and monitoring, and indeterminate target tracking. Based on research and analysis conducted by the inventors of the present subject matter, it was discovered that the capabilities common to all three of the above described applications were relatively small. It was also surprisingly discovered that the intersection of common features can be encompassed by a map-based command center. This resulting intersection of features provides a basis for the synergistic effects achieved by the open-architecture core and system described herein.

An aspect of disclosed embodiments is flexibility within the application domain. That is, embodiments bring together aspects of security monitoring and UV control in a way that provides increased benefits beyond those of the individual systems running alone. This is particularly true when indeterminate target tracking is also included in the system, providing a flexible, seamless, and easily accessible control suite with improved operator and command-level situational awareness.

Other aspects of the present subject matter may include recognizing/detecting, and configuring the system for, unknown vehicles, subscriptions for designated feeds to the remote assets, assigning input channels and parameters to feeds from the remote assets, remote asset control functions, sensor functions, sensor feeds, control link, and asset tracking.

Embodiments may include the core providing capabilities that combine UV and sensor control in a single control suite. For example, the UV control modules and the sensor monitoring capabilities may be linked in a way that expands the capabilities of the individual systems operating independently, such as using an unmanned robot to perform as an advanced roving security patrol.

Embodiments may include a command and control system including a core unit with a processor and a map display engine. The core unit may be configured to exchange information with (1) a multi-domain heterogeneous unmanned vehicle command and control module; (2) a multi-sensor command, control and monitoring module; and (3) an asset tracking module that estimates a location of an indeterminate object.

The core unit may also include a control unit that exchanges information with an input device; a detecting unit that detects modules that are associated with the core unit; a subscription unit that logs parameters associated with the detected modules and determines types of data to send to the detected units based on the parameters; a script unit that receives and implements command and control scripts for the detected modules; and a display output that provides display information to display a combined representation of information from the detected modules and map information, including locations of the vehicles and sensors under control and the estimated location of the indeterminate object.

Embodiments may include wherein the script unit is configured to download a script from a vehicle or sensor detected by the system. The script may be implemented by one of the command and control modules to control or monitor the vehicle or sensor.

Embodiments may include wherein the script unit is configured to download a script identifier from a vehicle or sensor detected by the system, and retrieve a script based on the script identifier. The script may be implemented by one of the command and control modules to control or monitor the vehicle or sensor.

Embodiments may include wherein the asset tracking module, or step, is configured to predict a location of the indeterminate object based on historical data, motion characteristics, and latency related to the indeterminate object. Embodiments may also include wherein motion characteristics of the indeterminate object are acquired from a database based on a type of the indeterminate object. The motion characteristics may include, for example, a turning rate, minimum speed, maximum speed, acceleration capability and deceleration capability related to the identified type.

Embodiments may include wherein the future location is a "bubble" encompassing possible locations where the indeterminate object may be during a designated time based on the turning rate, minimum speed, maximum speed, acceleration capability and deceleration capability of the indeterminate object. In this regard, a "bubble" may be understood as a designated area in three-dimensional space that surrounds possible locations where the indeterminate object may be located within a designated time. A designated time may be include a current time, a future time and/or a time span.

Embodiments may include wherein the display output includes information regarding an indeterminate object only when the respective future location of the indeterminate object satisfies a predetermined criteria with respect to an asset under control.

Embodiments may include a payload unit, or step, that detects and controls optional capabilities of vehicles and sensors under control of the modules, and the payload unit is configured to detect the optional capabilities based on information, and/or a script identifier, received from the vehicle and sensor under control.

Embodiments may include wherein the system, or method, is configured to validate commands on a control side against limits of the vehicle or sensor under control, the limits received from the vehicle or sensor.

Embodiments may include wherein the modules comprise an interpreting unit that interprets the protocol of a vehicle or sensor under control, or information fed to the tracking module, to a standard protocol for translation with the core unit, each of the modules communicating with the core unit only in the standard protocol.

Further advantages of the present subject matter will become apparent to those of ordinary skill in the art upon reading and understanding the following detailed description of the preferred embodiments.

DETAILED DESCRIPTION OF THE INVENTION

In the following description, embodiments are described in sufficient detail to enable those skilled in the art to practice the invention. It is to be understood that other embodiments are contemplated without departing from the scope of the present invention. The following detailed description is, therefore, exemplary and not to be taken in a limiting sense.

Figure 1:
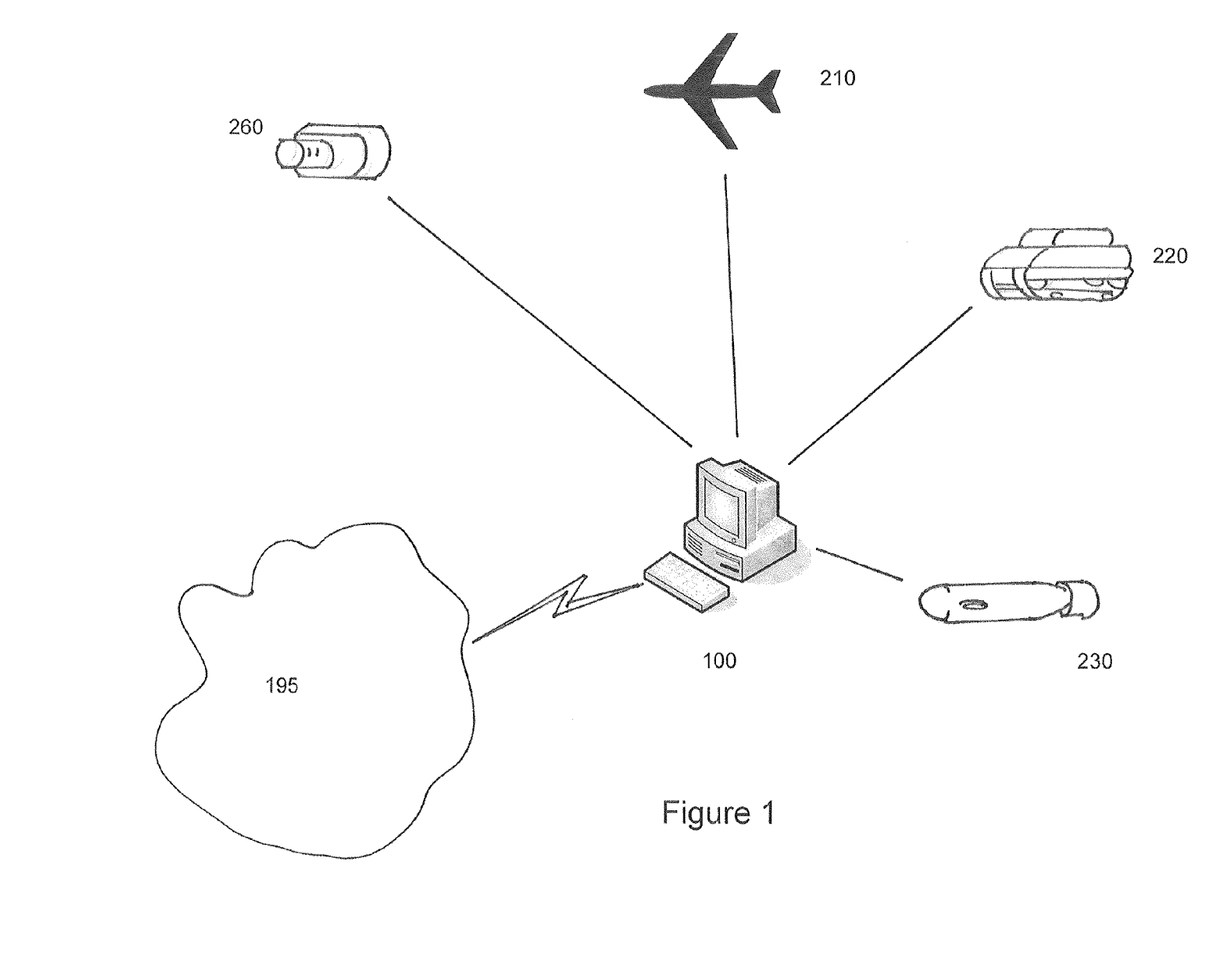
FIG. 1 depicts a control system architecture in accordance with exemplary embodiments.

The described embodiments relate to systems and methods and for controlling and monitoring remote assets in coordination with the tracking of indeterminate objects. Thus, as depicted in FIG. 1, embodiments may include a station 100 in communication with various assets. The station 100 may take many forms depending on the level and scope of control needed, as well as other support assets that may be available to compliment the required processing and communications.

For example, the station 100 may take the form of a computer workstation, ruggedized laptop computer, or handheld computing/communication device. Advances in control and communications technologies may even further miniaturize the required hardware to accomplish the described structure and function herein. As such, the examples identified above should not be understood as limiting the scope of the invention itself.

The assets may be under various levels of control and/or monitoring, including locomotive and/or directional control, sensor monitoring, payload control, etc. Remote assets may include UAV 210, USV (ground) 220, USV (water-borne) 230, UUV 240, and sensor(s) 260. Station 100 may be in communication with a broader network 195, which as described further below, can provide additional resources, communication links, etc.

Figure 2:
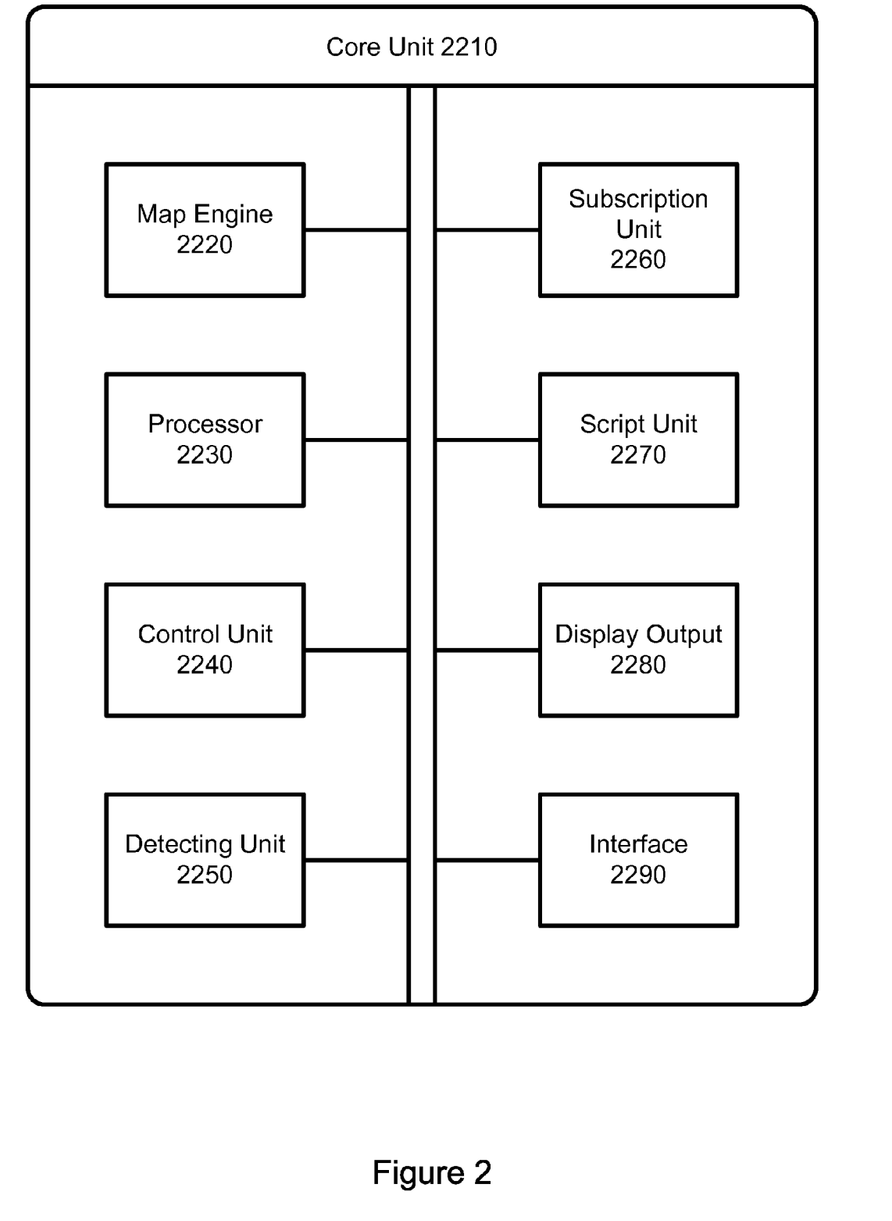
FIG. 2 depicts a control system architecture in accordance with exemplary embodiments.

As shown in FIG. 2, in one approach, the station 100 comprises a command and control system including a core unit 2210 with a processor 2230 and a map display engine 2220. As described in detail below, disclosed embodiments provide for a core unit that is associated with a series of managers built around a map engine. The managers range in function from, for example, loading modules to maintaining window visibility to tracking the current measurement units the application should display. The functions provided by these managers extend to all types of the control center applications.

Figure 3:
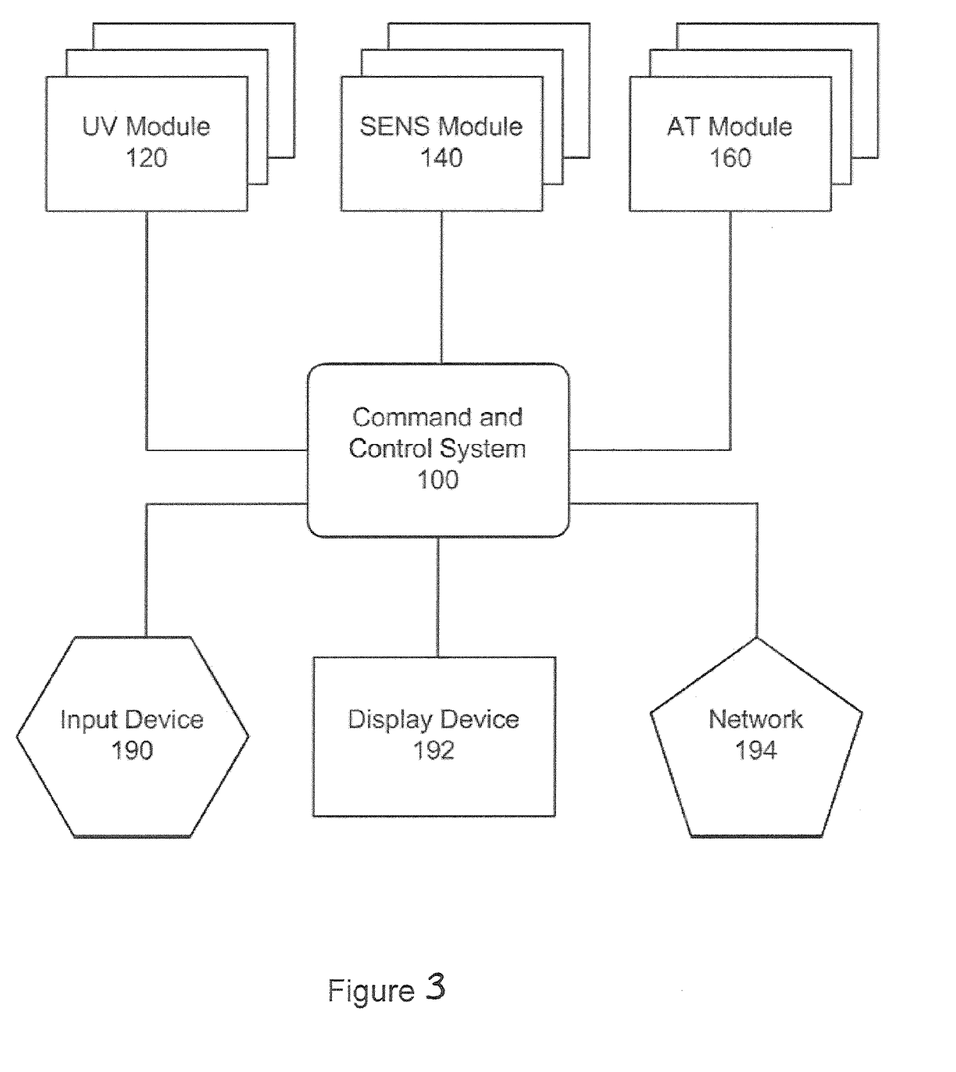
FIG. 3 depicts a control system architecture in accordance with exemplary embodiments.

The map display engine 2220 generally combines map information with location information for identified objects, and combines them in a combined display. The display engine may also rely on, or independently calculate, predictive or estimated location information for indeterminate objects. As discussed further below, the display engine may also discriminate between what objects to display and what objects not to display depending on the specific relevance of the object to assets under control or other variables. As shown in FIG. 3, The core unit may be configured to exchange information with (1) a multi-domain heterogeneous unmanned vehicle command and control module 120; (2) a multi-sensor command, control and monitoring module 140; and (3) an asset tracking module 160. As also shown in FIG. 3, the command and control system 100 may be linked to a display device 192.

The core unit 2210 may also include a control unit 2240 that exchanges information with external devices, such as an input device 190 (shown in FIG. 3). This can provide, for example, various functions for controlling assets through a joystick or other input device. The control unit can be configured, based on particular scripts, to recognize certain inputs and associate them with particular vehicle, payload or sensor controls.

The detecting unit 2250 can be used to detect modules that are associated with the core unit. In exemplary embodiments this may include initializing a recognition sequence on start-up or other designated schedule. It may also be initiated on user command, or in response to received communication, such as from a newly installed module. The detecting unit 2250 provides flexibility in adding additional modules, or features to modules, in operation, with minimal time, and reconfiguration of the core unit 2210 itself.

Figure 4:
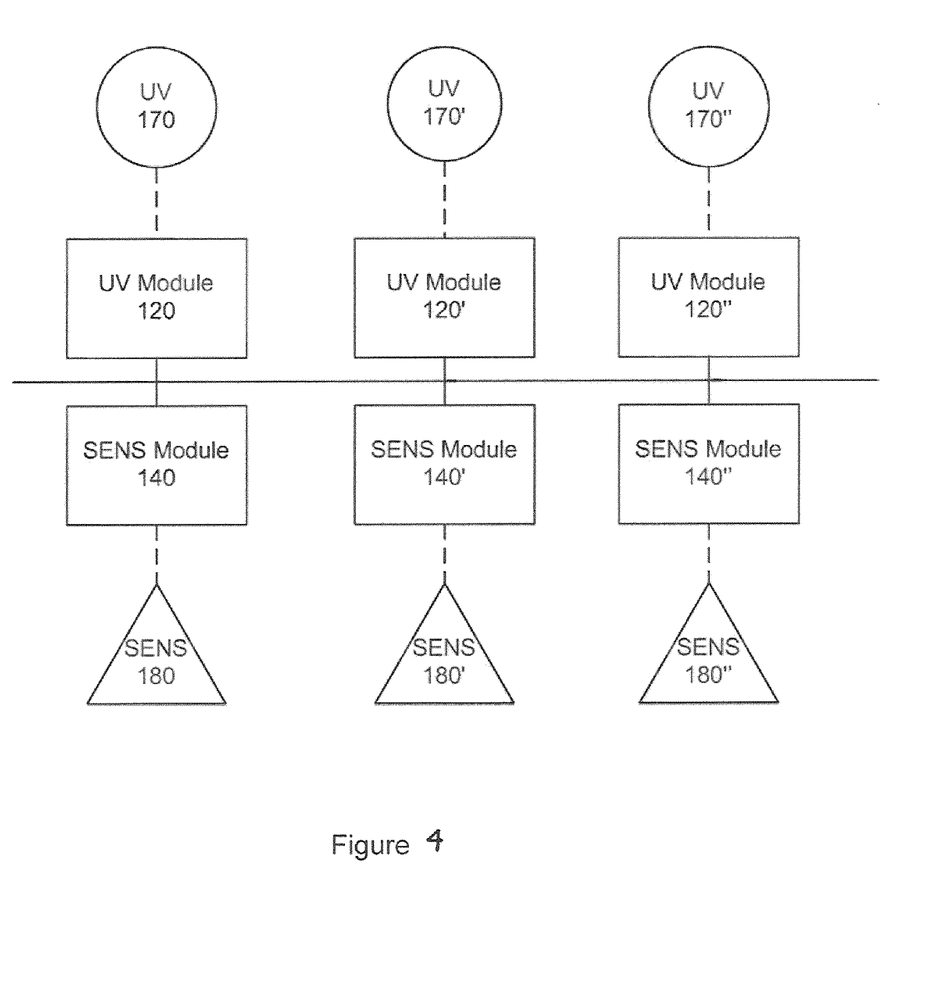
FIG. 4 depicts a control system architecture in accordance with exemplary embodiments.

The subscription unit 2260 may log parameters associated with the detected modules and determine types of data to send to the detected units based on the parameters. For example, as depicted in FIG. 4, multiple UV modules 120 and sensor modules 140 may be detected by the detecting unit. The UVs 170 associated with the various UV modules 120 may be of different types, such as UAVs, UUVs etc. Likewise, the various sensors 180 associated with the different sensor modules 140 do not require, or provide, the same information as the UVs. In order to streamline communications between the core unit and the several modules, that may only require particular information, the subscription unit provides for individualized lists of data to be exchanged with each particular module. When used in conjunction with a core unit and translating units that allow the core unit to exchange information in only a common protocol, despite differences in individual vehicle control protocols, this can greatly streamline the processing required of the core unit and provide maximum flexibility in implementing various modules. For example, certain UUVs may have a lower bandwidth than UAVs. Therefore, the subscription unit may provide for communications, such as status updates, to be performed at a lower rate for a UUV under control than a UAV under control, based on respective subscriptions. As another example, mission-particular limitations may be implemented by a user to limit the exchange of certain data elements that are not required for the mission of a UV under control.

The script unit 2270 may download, receive and implement command and control scripts for the detected modules and associated assets. A script may be understood as a file containing a list of commands, allowing them to be invoked once to execute in sequence, or, more broadly in the sense of a script language which is a set of commands or programming language that controls an application. Scripts are often considered to be distinct from programs, which execute independently from other applications. In the context of UVs, a script may provide, for example, a range of commands, control parameters, and protocols with which the software and hardware resident on the UV are controlled and/or exchange information with a control/monitoring unit. Sensors may also benefit from the use of scripts such as when the sensor has some adjustable functionality associated with it, e.g. zoom, spectrum, or other modifiable sensor parameters.

Scripts may be tailored to the remote asset under control, and to specific modules. For example, based on different data requirements, a data exchange may be tailored to capabilities, eliminating the need to exchange a full compliment of standardized protocol information. Vehicle Modules may implement vehicle status updates, such as the location, speed and heading of the vehicle. A Payload Module may implement payload status updates, such as a camera direction, and also the relevant vehicle status information, such as the vehicle location.

The script unit 2270 may receive the scripts from a variety of sources. For example, the asset itself may provide the script needed to control it and/or associated payload via the module 120. Alternatively, the asset may provide a script identifier, which is an identifier typically with less data content than the full script, which allows the command system 100 to acquire the script, such as from another network location 194 or local memory. The use of a script identifier can provide several benefits in the context of the present subject matter, such as separating the script needed to control an asset from communications emanating from the asset. That is, instead of the asset communicating the script itself, which could potentially be intercepted and decrypted (if encrypted), the script identifier is only useful to those that have access to the actual script that is identified. Thus, a simple script identifier can be transmitted unencrypted to establish the control protocol, which may be more reliable and robust, and even more secure, than sending encrypted control scripts. Script identifiers may also provide benefits in low-bandwidth communications by minimizing the amount of data that must be transmitted between the asset and the command station, or in high-threat environments, when communications emanating from the asset may expose it to increased vulnerability.

Figure 5:
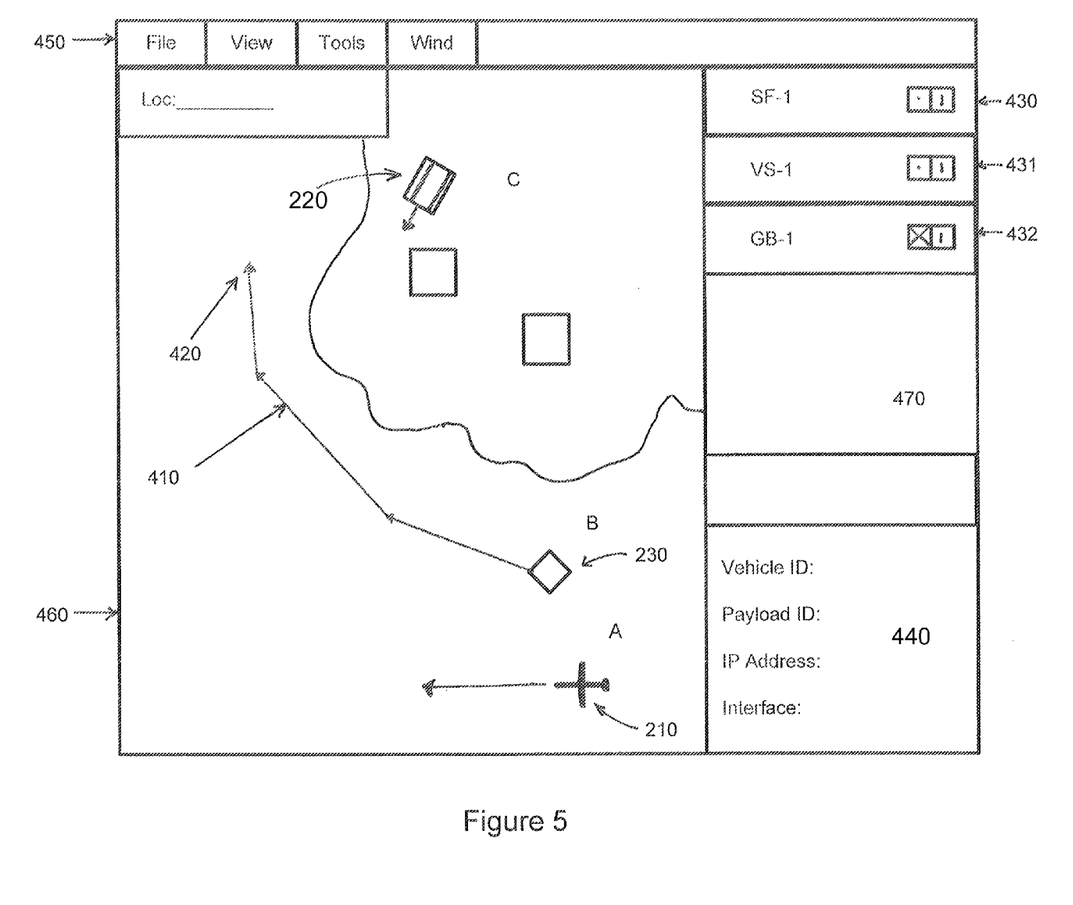
FIG. 5 depicts a display in accordance with exemplary embodiments.

The display output 2280 may provide display information to display a combined representation of information from the detected modules and map information, including, for example, locations of the vehicles and sensors under control and the estimated location of the indeterminate object. The display information may be used to create, for example as shown in FIG. 5, a display including a command bar 450, a map area 460, asset identification, and connection area 440, or selected combinations thereof. The command bar 450 may include selectable menus with commands relevant to the system 100 itself or assets under control. The assets under control may be identified in areas 430, 431, and 432, where 430 corresponds to UAV asset 210, 431 corresponds to UUV 230, and 432 corresponds to USV (land) 220. In embodiments, a user may select between the various assets under control by selecting appropriate activation buttons within the corresponding identification area. Thus, a single user may control multiple non-heterogeneous assets from a single interface.

The display may also include a feed area 470 that displays information from assets under control, such as sensor information. For example, when a video sensor is under control, the video feed from the sensor may be displayed in area 470. This area is customizable to accommodate multiple feeds if desired. Alternatively, the feed area 470 can be linked to audio or any other information fed from an asset that may be of interest to the user. Based on the core unit framework, the system can support a full range of information feeds simply by logging the relevant parameters and loading appropriate scripts to support the feed.

Figure 6:
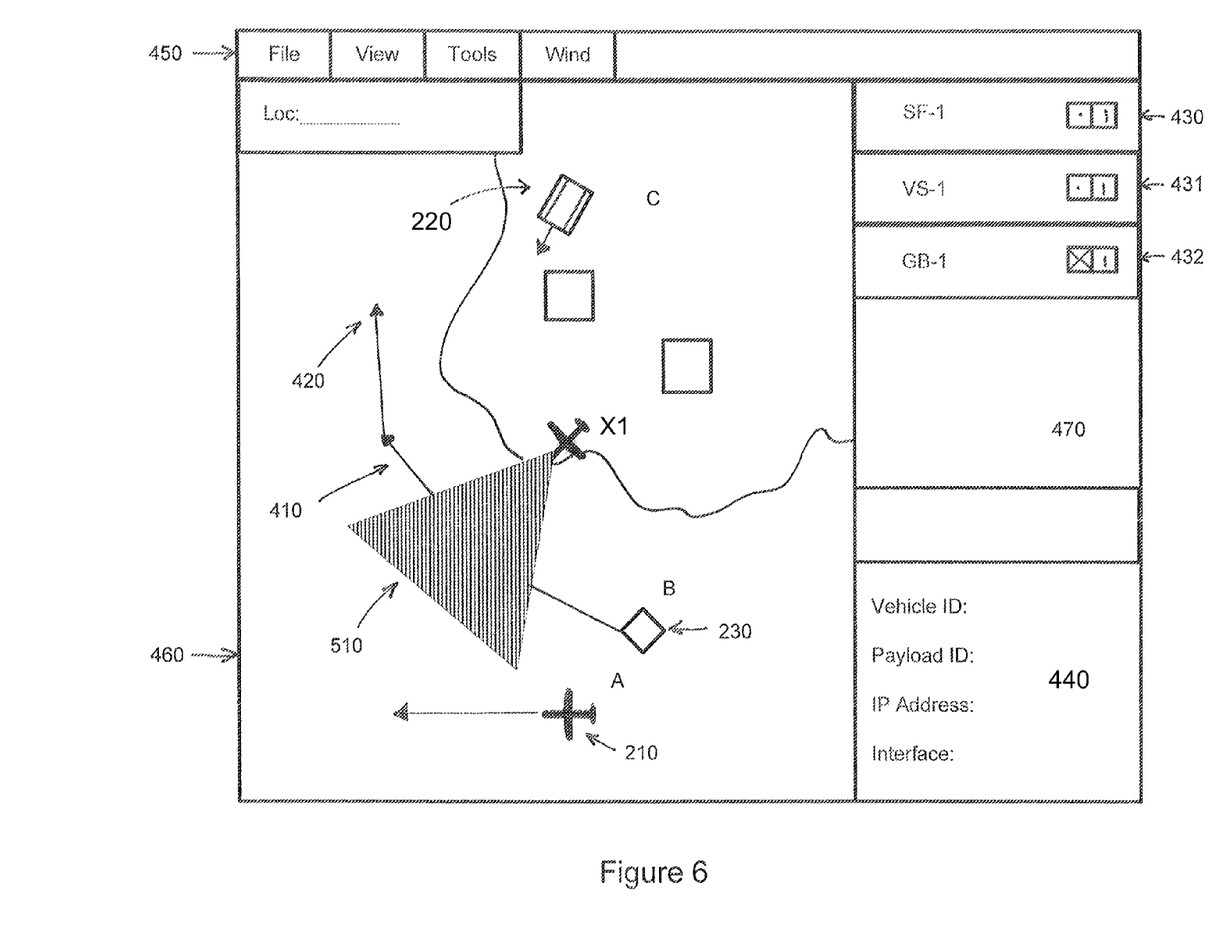
FIG. 6 depicts a display in accordance with exemplary embodiments.

As shown in FIG. 6, the display may also include information derived from the asset tracking module. For example, aircraft X1 may be designated as an object of interest and incorporated into the display, along with the displays of the assets and map information. The present subject matter addresses many difficulties in the display of indeterminate objects, particularly in the context of command and control systems. One of the main difficulties in depicting indeterminate objects in a useful way is related to latency. Latency is understood essentially as a delay in information exchange. Latency can arise from a number of issues including, for example, time lags in communication links, sporadic signaling, and/or processing delays. Latency can result in inaccurate displays of information, particularly in environments in which vehicles are moving quickly, significant processing is required, and/or relied-upon information is not available on a near-constant basis. The present subject matter addresses the concept of latency in a number of ways. For example, predictive models may take into account latency, along with telemetry data and vehicle parameters in assembling the predictive representations of indeterminate objects. The telemetry data in such predictive modeling may include past, present and expected telemetry information of the object in question.

As shown in FIG. 6, an aircraft X1 may be considered to be an indeterminate object. This could arise from latency with respect to the detection of X1, or it could be that the significant position of X1 is not the current position but a future position. For example, UAV 210 is on a heading that converges with that of X1. As such, the system may automatically identify X1 as an object of interest. The asset tracking module may predict a location of X1 based on historical data, motion characteristics, and latency related to X1. In this example, the system may have been tracking X1 to obtain a heading and speed. The system may identify X1 simply as an aircraft or, with more available information, a particular type of aircraft. The system may then acquire motion characteristics related to X1 based on the identified type. The motion characteristics may include, for example, a turning rate, minimum speed, maximum speed, acceleration capability and deceleration capability related to the identified type. By using some, or all of the acquired characteristics, in coordination with any historical or real time data, a predictive model may be established for an estimated location of X1.

The estimated location may be a "bubble" encompassing possible locations where the indeterminate object may be during a designated time based on the turning rate, minimum speed, maximum speed, acceleration capability and deceleration capability of the indeterminate object. In this regard, a bubble 510 may be understood as a designated area in three-dimensional space that surrounds possible locations where X1 may be located within a designated time. A designated time is not limited to a future time, and may include a current time, a future time and/or a time span. In the scenario depicted in FIG. 5, the current location of X1 is relatively determined, with a possible bubble for the designated future time, e.g. T+15 seconds, is shown in bubble 510.

As indicated above, current command and control systems can suffer form information overload, in which a user is presented with too much information. Not all of the information may be relevant to the user, particularly depending on the type of asset under control and/or the location of the assets and objects. For example, a system in control of UUVs only may be less concerned with land-based objects. Accordingly, embodiments of the present subject matter provide for various screening techniques whereby the display may selectively include only that information that is of concern to the user. This can take the form of the user designating certain object types as being always, or sometimes, excluded from the display. For example, as suggested above, a user may designate vehicle types, such as land vehicles, to be omitted. The display output may also be tailored to includes information regarding an indeterminate object only when the respective future location of the indeterminate object satisfies a predetermined criteria with respect to an asset under control.

As shown in FIG. 5, aircraft X1 is not displayed. However, in FIG. 6 X1 is displayed because, for example, the bubble 510 is considered to satisfy a predetermined criteria. In this example, the bubble is (1) associated with an aircraft that is (2) within a designated distance of an air asset 210 under control. If X1 were a ground vehicle with the same predictive location bubble, it could be omitted from display since (1) it is not an air asset and (2) it does not come within range of the USV 220 under control. These parameters can be modified automatically with respect to the asset under control as well, such as taking into account the speed, altitude, or other telemetry data of the asset under control to modify the predetermined criteria. For example, the relevant approach distance may be less for a UAV traveling at 20 mph compared to that of a UAV traveling at 200 mph.

In the broad sense, when the predictive model satisfies a predetermined criteria, the visual display is changed, or some other user-recognizable alarm is initiated. A change to the visual display may include changing the color of a display, the size of an object, and/or displaying information regarding the indeterminate object only when the predictive model satisfies the predetermined criteria with respect to an asset under control. All of these may contribute to simplifying the display for the asset control system, by emphasizing or excluding objects that are or are not relevant in the context of the particular assets under control.

A payload unit may also be included in the core unit that compliments the functions of the detecting unit 2250, subscription unit 2260 and script unit 2270. For example, a payload unit may be configured to detect and control optional capabilities of vehicles and sensors under control of the modules. This can provide additional functionality to modules, that may be directed to a particular asset, by allowing for payloads and associated controls to be implemented that are not supported by the module for the asset. For example, a module Z may be designed to support UAV with a range of payloads B-D. Module Z does not recognize or support payload E. However, the payload unit can independently detect payload capability E and support that capability through, or independently of, module Z. Thus, the system 100 can be configured to detect optional capabilities, that are beyond the platform control modules per se based on information, and/or a script identifier, received from the vehicle and sensor under control.

An additional challenge in the control of UVs is the allocation of processing, particularly with respect to control parameters. In view of these problems, and in an effort to reduce the processing requirements for UV and to provide more immediate validation for user commands, embodiments may include wherein the system 100 is configured to validate commands on a control side against limits of the vehicle or sensor under control. In this way the vehicle or sensor may only be responsible for transmitting control limits to the control system, and not need to validate individual commands. For example, as depicted in FIG. 5, the command system may receive control limits from UUV 230 that restrict it operation to a minimum and maximum depth. Thus, if the user instructs the UUV 230 to travel to point 420, the system can validate the command against the limits before sending the commands to the vehicle. Thus, the system 100 can plot track 410 within the set limits, avoiding minimum and maximum depths, and transmit the validated route commands to the UUV 230.

Controlling multiple multi-domain heterogeneous assets also presents unique challenges in the communication protocol for the system. Different assets may use different communication protocols, such as STANAG or JAUS, as well as the use of vendor specific private messages within given protocols. Accordingly, the described modules 120 may comprise an interpreting unit that interprets the protocol of a vehicle or sensor under control, or information fed to the tracking module, to a standard protocol for translation with the core unit. Thus, the core unit itself can be configured to communicate on a single standard protocol and each of the modules communicate with the core unit only in the standard protocol. This method of standardizing communication at the core unit provides for expanded module capabilities, which enhances the value of the core to the user. For example, because the core is a truly open architecture, it can be used with various later-developed UV systems simply by adding a new module, regardless of the protocol differences of the newer UV systems.

According to the above-described features, a core and module configuration provides numerous benefits to the designers and users of such systems. For example, by adding additional capabilities by creating modules, or extensions, to the core, rather than redesigning the core itself, a more flexible control platform than those previously being used is provided. In general, application-specific semantic knowledge resides in the modules. According to this architecture, the core software may be applied to a broad spectrum of problems without modification, leaving the modules to take care of the details. Even those systems that are currently described as "open" do not satisfy these requirements based on the "private messages" and the like that are not standardized across systems and which interfere with interoperability of control, communication and modification.

In addition, embodiments of the present invention further relate to computer readable media that include program instructions for performing various computer-implemented operations. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 7:
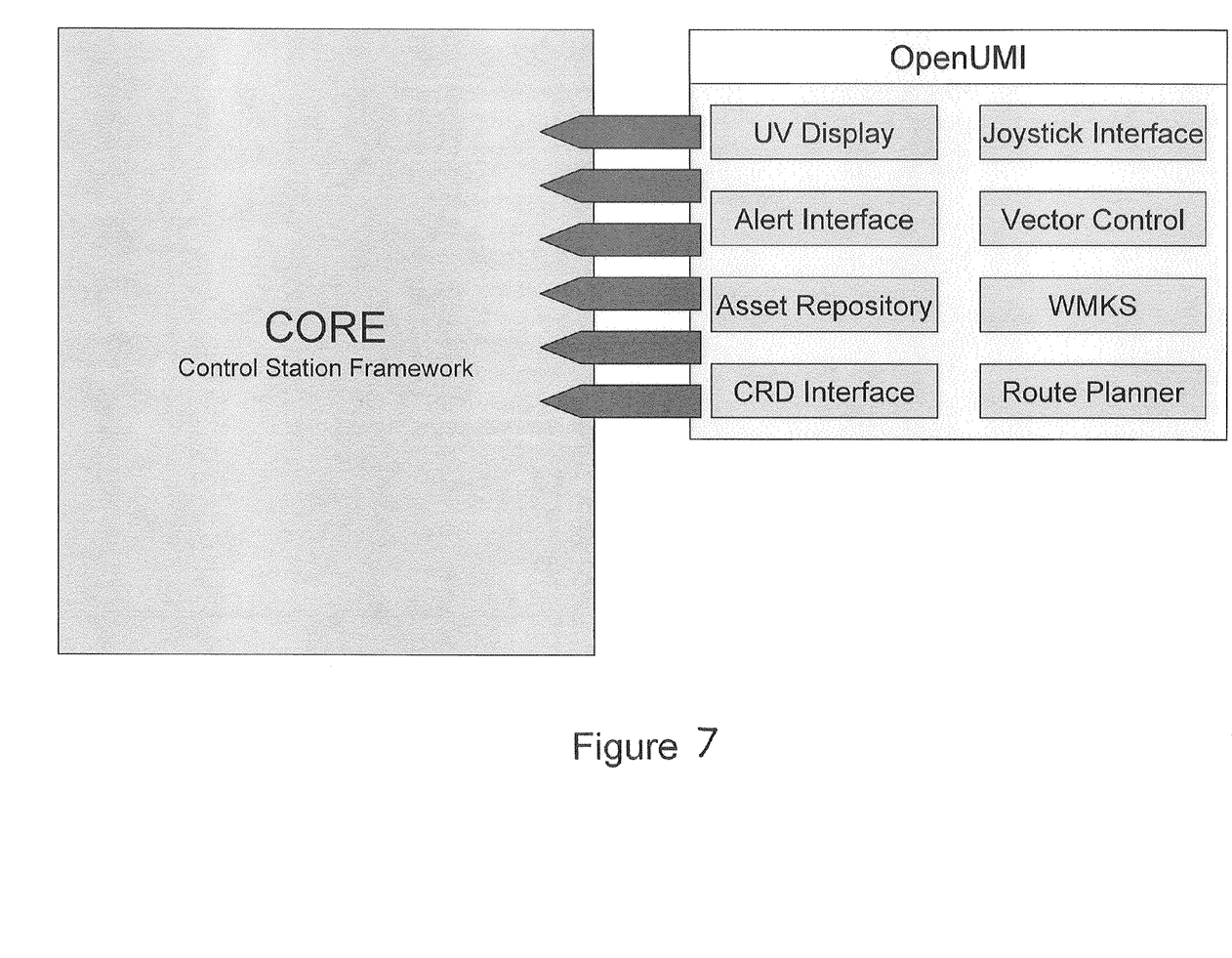
FIG. 7 depicts a control system architecture in accordance with exemplary embodiments.
Figure 8:
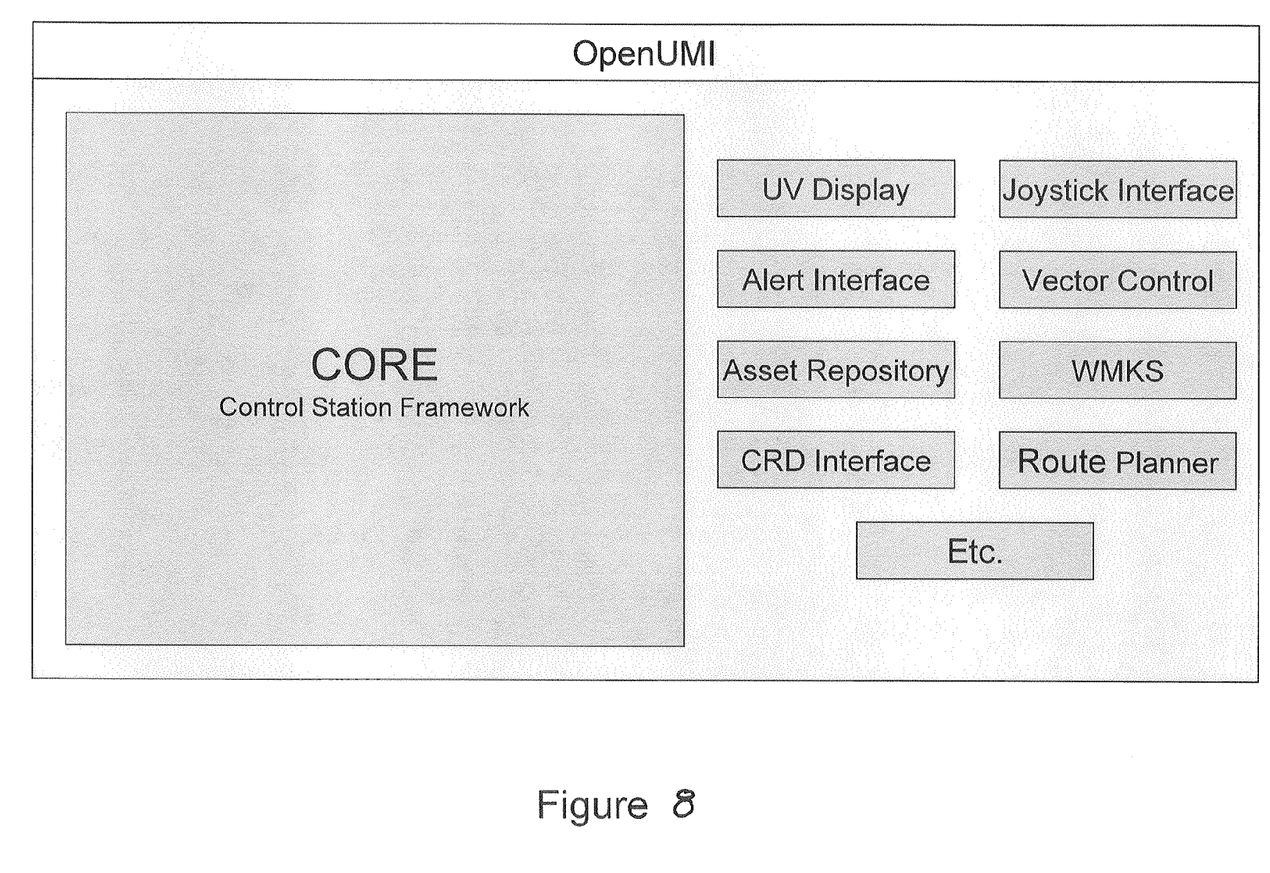
FIG. 8 depicts a control system architecture in accordance with exemplary embodiments.

FIGS. 7 and 8 depict different control system architectures according to exemplary embodiments. FIG. 7 provides an example in which the Open UMI may comprise certain elements, such as, a UV display, Alert interface, Asset Repository, CRD Interface, Joystick Interface, Vector Control, World Model Knowledge Store (WMKS), Route Planner, etc. It is noted that WMKS is a JAUS-defined C4ISR construct. The Open UMI application, and the associated elements, may be linked to a core control station framework. Alternatively, the Open UMI may encompass the control station framework and the associated elements, as depicted in exemplary manner in FIG. 8. Alternative configurations are also contemplated that would not materially depart from the scope of the overall disclosure.

Figure 9:
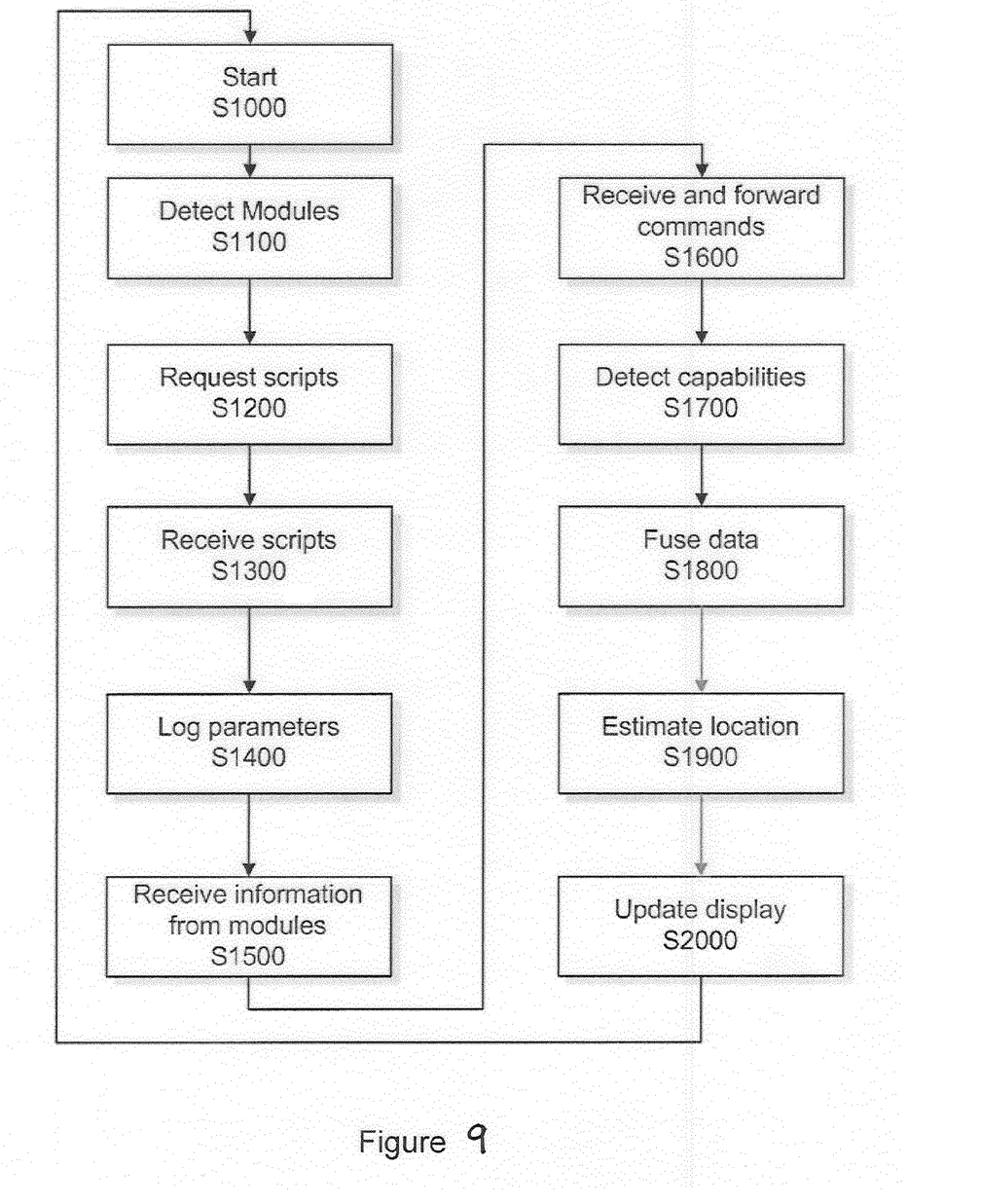
FIG. 9 depicts a method in accordance with exemplary embodiments.

FIG. 9 depicts a method in accordance with exemplary embodiments. It should be understood that, although the exemplary method is depicted in sequential manner for ease of depiction and explanation, the methodology is not limited to such an implementation. Based on system capabilities, including for example, dynamic module recognition, data exchange and various parallel processing methods, the exemplary functions may be initiated, conducted and/or completed in various ways without departing from the scope of the invention. The exemplary method may begin with a startup, or continuation of a previous iteration, in S1000 and continue with S1100.

In S1100, modules may be automatically detected by the system. Initiating detection may be accomplished manually, or by automatic protocols that alert the system to, for example, the addition of a new asset under control, or available for control. The method continues with S1200.

In S1200, the system may request scripts according to, for example, parameters associated with the detected modules. The scripts may be used to determine types of data to exchange with the detected modules based on the parameters. The method continues with S1300.

In S1300, the system may receive scripts based on the requested scripts. The scripts may be received in a variety of manners, as discussed herein, and other known methods for receiving scripts in a networked environment. The method continues with S1400.

In S1400, the system logs parameters associated with the detected modules. Such parameters may be set based on, in coordination with, or independently of, the scripts related to the detected modules. A user may further refine the parameters to customize the data exchange between the Open UMI and the asset under control. The method continues with S1500.

In S1500, the system may receive information from the detected modules. Such information may include, for example, status, sensor, and other data from assets under control that communicate with the Open UMI through respective modules. As described herein, data received from an asset under control may be translated from an asset-specific protocol to an Open UMI protocol via the module. The method continues with S1600.

In S1600, the system may receive commands, for example, from a user interface. These commands may be forwarded to an asset under control via a module associated with the asset. As described herein, forwarding commands from the Open UMI to the asset may include translating the commands from an Open UMI protocol to a protocol associated with the asset via the module. The method continues with S1700.

In S1700 the system may detect capabilities, such as capabilities of assets under control. Capabilities may include detectable payloads associated with the assets under control, other capabilities that are not apparent from the initially detected modules, and/or optional features of the asset or payload of the asset. New modules may be established, or existing modules modified, based on the detected capabilities. The method continues with S1800.

In S1800, received data may be fused by the system. Fusing the data may include, for example, combining data related to a particular asset or combining data from a plurality of assets. Data fusion may result in, for example, a set of related data, as in the case of different data types related to an object, or refinement of a set of similar data, as in the case of data of a particular type gathered from different sources. The method continues with S1900.

In S1900 a location may be estimated, such as a location of an indeterminate object or an asset under control. As detailed herein, estimating a location can be applied in several circumstances to achieve a number of different objectives. Estimating may include taking into consideration latency factors, movement capabilities of an object, movement values of an object, etc. to determine an estimated position, a position window, and/or expected position according to a given time variable. The estimating may use dissimilar, or similar, data fused during the data fusion to optimize a given value. For example, data related to a target may be gathered by various assets under control, or other sources. The data may include video, radar, sigint, mapping, imagery, or other data. Some data may be fused with location and direction information for a related asset and/or sensor in order to provide additional context necessary to apply the data from different sources to a common object.

When this data is fused, a more precise location may be estimated than would be possible from any of the sources used in isolation. A simple example could be combining two video feeds, each with an associated origin position and three-dimensional direction vector fused to estimate a target position. Additionally, as discussed herein, latency and/or intermittent detection can be compensated for by incorporating heading, speed, movement capabilities and combinations thereof into the estimation calculations for targets and assets under control.

Estimated and determined positions may be compared with predetermined criteria to activate alarm conditions, or limit control commands communicated to an asset. For example, an asset under control may have operational parameters such as maximum/minimum operating depths, altitudes, etc. The system may calculate that, based on a current heading and speed, the expected position for the asset is estimated to violate one or more of these parameters in a given time. By alerting the user to this beforehand, the system may allow for advanced correction of this by the user, without relying on the asset's onboard correction measures. Additionally, the system may prohibit command inputs that are expected to violate the asset's parameters, or other user-defined parameters, such as those set for a particular mission. The method continues with S2000.

In S2000, the display is updated to reflect the data elements that have changed based on the variously received, transmitted and calculated information. As described herein, the display of data elements may include, for example, location, track, asset status, alarm, indeterminate object, and various sensor information. The display may also be responsive to user commands that alter the display with respect to a particular asset, target, or other object. For example, the format of the display may be changed to present information that is particularly relevant to the type of asset under control and the current circumstances, e.g. altitude and topography for low-flying UAVs, or depth and underwater topography for AUVs that are close to shore. Such display changes may be beneficially used to avoid information overload as previously discussed.

Figure 10:
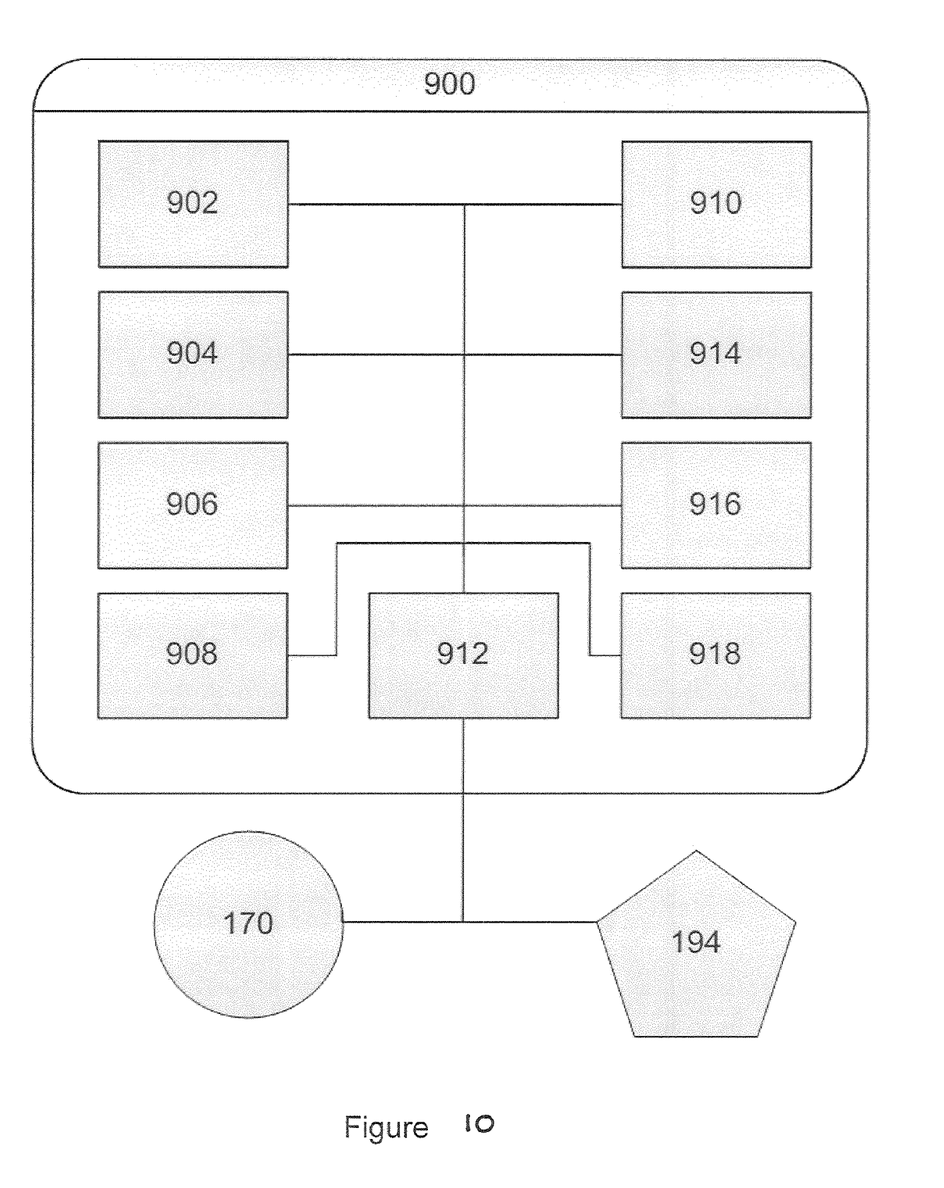
FIG. 10 depicts a control system architecture in accordance with exemplary embodiments.

FIG. 10 schematically illustrates a typical computer system in accordance with an embodiment of the present invention. The computer system 900 includes any number of processors 902 (also referred to as central processing units, or CPUs) that are coupled to storage devices including primary storage 906 (typically a random access memory, or "RAM"), primary storage 904 (typically a read only memory, or "ROM"). As is well known in the art, primary storage 904 acts to transfer data and instructions uni-directionally to the CPU and primary storage 906 is used typically to transfer data and instructions in a bi-directional manner. Both of these primary storage devices may include any suitable type of the computer-readable media described above. A mass storage device 908 is also coupled bi-directionally to CPU 902 and provides additional data storage capacity and may include any of the computer-readable media described above. The mass storage device 908 may be used to store programs, data and the like and is typically a secondary storage medium such as a hard disk that is slower than primary storage. It will be appreciated that the information retained within the mass storage device 908, may, in appropriate cases, be incorporated in standard fashion as part of primary storage 906 as virtual memory. A specific mass storage device such as a CD-ROM 914 may also pass data uni-directionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. As described above, the system may include specific input devices for controlling UVs, such as a joystick 916, or particular output devices, such as display 918.

CPU 902 optionally may be coupled to a communications network using a network or other connection as shown generally at 912. With such a connection, it is contemplated that the CPU might receive information from the network, or might output information to the network in the course of performing the above-described steps. The above-described devices and materials will be familiar to those of skill in the computer hardware and software arts.

The hardware elements described above may be configured (usually temporarily) to act as one or more software modules for performing the operations of this invention. For example, instructions for detecting an encoding type, transforming that encoding type, and identifying a default name server may be stored on mass storage device 908 or 914 and executed on CPU 708 in conjunction with primary memory 706.

The invention has been described with reference to exemplary embodiments. Modifications and alterations of the described embodiments may be evident to those of ordinary skill in the art upon a reading and understanding of this specification. The present subject matter is intended to include all such modifications and alterations insofar as they come within the scope of the appended claims, or the equivalents thereof.

What is claimed is:

1. A command and control system comprising:
    a core unit, including a processor and a map display engine, configured to exchange information with:
        a multi-domain heterogeneous unmanned vehicle command and control module;
        a multi-sensor command and control module; and
        an asset tracking module that estimates a location of an indeterminate object;
    a control unit that exchanges information with an input device;
    a detecting unit that detects modules that are associated with the core unit;
    a subscription unit that logs parameters associated with the detected modules and determines types of data to send to the detected units based on the parameters;
    a script unit that receives and implements command and control scripts for the detected modules;
    a display output that provides display information of a combined representation of information from the detected modules and map information, including locations of the vehicles and sensors under control and the estimated location of the indeterminate object.

2. A system according to claim 1, wherein the script unit is configured to download a script from a vehicle or sensor detected by the system, the script implemented by one of the command and control modules to control or monitor the vehicle.

3. A system according to claim 1, wherein the script unit is configured to:
    download a script identifier from a vehicle or sensor detected by the system; and
    retrieve a script based on the script identifier, the script implemented by one of the command and control modules to control or monitor the vehicle.

4. A system according to claim 1, wherein the asset tracking module is configured to predict a location of the indeterminate object based on historical data, motion characteristics, and latency related to the indeterminate object.

5. A system according to claim 4, wherein motion characteristics of the indeterminate object are acquired from a database based on a type of the indeterminate object, the motion characteristics including a turning rate, minimum speed, maximum speed, acceleration capability and deceleration capability.

6. A system according to claim 5, wherein the future location is a bubble encompassing possible locations where the indeterminate object may be during a designated time based on the turning rate, minimum speed, maximum speed, acceleration capability and deceleration capability of the indeterminate object.

7. A system according to claim 6, wherein the display output includes information regarding the indeterminate object only when the respective future location of the indeterminate object satisfies a predetermined criteria with respect to an asset under control.

8. A system according to claim 1, further comprising a payload unit that detects and controls optional capabilities of vehicles and sensors under control of the modules.

9. A system according to claim 8, wherein the payload unit is configured to detect the optional capabilities based on information received from the vehicle and sensor under control.

10. A system according to claim 8, wherein the payload unit is configured to detect the optional capabilities based on a script identifier received from the vehicle and sensor under control.

11. A system according to claim 1, wherein the system is configured to validate commands on a control side against limits of the vehicle or sensor under control, the limits received from the vehicle or sensor.

12. A system according to claim 1, wherein the modules comprise an interpreting unit that interprets the protocol of a vehicle or sensor under control, or information fed to the tracking module, to a standard protocol for translation with the core unit, each of the modules communicating with the core unit only in the standard protocol.

13. A non-transitory computer readable storage medium bearing instructions that, when executed by a computer, cause the computer to function as a command and control system comprising:
    a core unit, including a processor and a map display engine, configured to exchange information with:
        a multi-domain heterogeneous unmanned vehicle command and control module;
        a multi-sensor command and control module; and
        an asset tracking module that estimates a location of an indeterminate object;
    a control unit that exchanges information with an input device;
    a detecting unit that detects modules that are associated with the core unit;
    a subscription unit that logs parameters associated with the detected modules and determines types of data to send to the detected units based on the parameters;
    a script unit that receives and implements command and control scripts for the detected modules;
    a display output that provides display information of a combined representation of information from the detected modules and map information, including locations of the vehicles and sensors under control and the estimated location of the indeterminate object.

14. A non-transitory computer-readable medium according to claim 13, wherein the script unit is configured to download a script from a vehicle or sensor detected by the system, the script implemented by one of the command and control modules to control or monitor the vehicle.

15. A non-transitory computer-readable medium according to claim 13, wherein the script unit is configured to:
    download a script identifier from a vehicle or sensor detected by the system; and
    retrieve a script based on the script identifier, the script implemented by one of the command and control modules to control or monitor the vehicle.

16. A non-transitory computer-readable medium according to claim 13, wherein the asset tracking module is configured to predict a location of the indeterminate object based on historical data, motion characteristics, and latency related to the indeterminate object.

17. A non-transitory computer-readable medium according to claim 16, wherein motion characteristics of the indeterminate object are acquired from a database based on a type of the indeterminate object, the motion characteristics including a turning rate, minimum speed, maximum speed, acceleration capability and deceleration capability.

18. A non-transitory computer-readable medium according to claim 17, wherein the future location is a bubble encompassing possible locations where the indeterminate object may be during a designated time based on the turning rate, minimum speed, maximum speed, acceleration capability and deceleration capability of the indeterminate object.

19. A non-transitory computer-readable medium according to claim 18, wherein the display output includes information regarding the indeterminate object only when the respective future location of the indeterminate object satisfies a predetermined criteria with respect to an asset under control.

20. A non-transitory computer-readable medium according to claim 13, further comprising a payload unit that detects and controls optional capabilities of vehicles and sensors under control of the modules.

21. A non-transitory computer-readable medium according to claim 20, wherein the payload unit is configured to detect the optional capabilities based on information received from the vehicle and sensor under control.

22. A non-transitory computer-readable medium according to claim 20, wherein the payload unit is configured to detect the optional capabilities based on a script identifier received from the vehicle and sensor under control.

23. A non-transitory computer-readable medium according to claim 13, wherein the system is configured to validate commands on a control side against limits of the vehicle or sensor under control, the limits received from the vehicle or sensor.

24. A non-transitory computer-readable medium according to claim 13, wherein the modules comprise an interpreting unit that interprets the protocol of a vehicle or sensor under control, or information fed to the tracking module, to a standard protocol for translation with the core unit, each of the modules communicating with the core unit only in the standard protocol.

25. A method of controlling multiple sensors and vehicles, while monitoring a target, the method comprising:
  detecting modules that are linked to a core unit including a processor and a map display engine, the modules including:
    a multi-domain heterogeneous unmanned vehicle command and control module;
    a multi-sensor command and control module; and
    an asset tracking module,
  receiving and implementing command and control scripts for the detected modules;
  logging parameters associated with the detected modules and determining types of data to send to the detected units based on the parameters;
  providing information to the core unit from the detected modules;
  providing control commands from an input device to the unmanned vehicle command and control module, and the multi-sensor command and control module, via the core unit;
  detecting and controlling optional capabilities of vehicles and sensors under control of the modules;
  estimating a location of an indeterminate object;
  displaying a combined representation of information from the detected modules and map information including locations of the vehicles and sensors under control and the estimated location of the indeterminate object,
  wherein, the modules comprise an interpreting unit that interprets a protocol of a vehicle or sensor under control, or information fed to the tracking module, to a standard protocol for translation with the core unit, each of the modules communicating with the core unit only in the standard protocol.

26. A method according to claim 25, wherein receiving and implementing command and control scripts for the detected modules comprises at least one of:
  downloading a script from a vehicle or sensor detected by the system, the script implemented by one of the command and control modules to control or monitor the vehicle; and
  downloading a script identifier from a vehicle or sensor detected by the system, and retrieving a script based on the script identifier, the script implemented by one of the command and control modules to control or monitor the vehicle.

27. A method according to claim 25, wherein estimating a location of an indeterminate object comprises predicting a location of the indeterminate object based on historical data, motion characteristics, and latency related to the indeterminate object.

28. A method according to claim 27, wherein:
  motion characteristics of the indeterminate object are acquired from a database based on a type of the indeterminate object, the motion characteristics including a turning rate, minimum speed, maximum speed, acceleration capability and deceleration capability; and
  the future location is a bubble encompassing possible locations where the indeterminate object may be during a designated time based on the turning rate, minimum speed, maximum speed, acceleration capability and deceleration capability of the indeterminate object.

29. A method according to claim 28, wherein the displaying includes information regarding the indeterminate object only when the respective future location of the indeterminate object satisfies a predetermined criteria with respect to a vehicle or sensor under control.

30. A method according to claim 25, further comprising:
  associating control limits with the vehicle or sensor under control based on at least one of limits received from the vehicle or sensor, and limits acquired based on a vehicle or sensor type; and
  validating commands on a control side against the limits of the vehicle or sensor under control.

* * * * *